United States Patent [19]

Pulak

[11] 4,033,726

[45] * July 5, 1977

[54] SPENT CATALYST REGENERATION APPARATUS WITH INTERNAL AND EXTERNAL REGENERATED-CATALYST RECYCLE MEANS

[75] Inventor: Richard P. Pulak, Palatine, Ill.

[73] Assignee: Universal Oil Products Company, Des Plaines, Ill.

[ * ] Notice: The portion of the term of this patent subsequent to Apr. 27, 1993, has been disclaimed.

[22] Filed: Dec. 16, 1974

[21] Appl. No.: 533,052

Related U.S. Application Data

[63] Continuation-in-part of Ser. No. 429,422, Dec. 28, 1973, Pat. No. 3,953,175.

[52] U.S. Cl. .............................. 23/288 B; 23/288 S; 208/164; 252/417
[51] Int. Cl.² .................. B01J 8/08; B01J 8/18; B01J 37/14
[58] Field of Search .......... 23/288 B, 288 S, 288 E; 252/417; 208/164

[56] References Cited

UNITED STATES PATENTS

| 3,893,812 | 7/1975 | Connor et al. | 23/288 B |
| 3,898,050 | 8/1975 | Strother | 23/288 B |
| 3,953,175 | 4/1976 | Pulak | 23/288 B |

Primary Examiner—Joseph Scovronek
Attorney, Agent, or Firm—James R. Hoatson, Jr.; Thomas K. McBride; William H. Page, II

[57] ABSTRACT

An apparatus for the oxidation of coke from an FCC spent catalyst is disclosed which comprises in combination and particular arrangement a spent-catalyst receiving chamber for containing a dense-bed of fluidized catalyst in which chamber spent catalyst is oxidized to produce regenerated catalyst and partially spent regeneration gas; a transfer conduit through which said gas and said catalyst pass and in which carbon monoxide is essentially completely converted to carbon dioxide to produce spent regeneration gas and regenerated-catalyst at an increased temperature; an internal regenerated catalyst recycle means by which a portion of hot regenerated catalyst can be recycled from the transfer conduit to the spent-catalyst receiving chamber; a regenerated-catalyst receiving chamber for containing a dense-bed of regenerated catalyst and in which spent regeneration gas and regenerated catalyst are separated; and, an external regenerated-catalyst recycle means by which a portion of hot regenerated catalyst can be recycled from the regenerated-catalyst receiving chamber to the spent-catalyst receiving chamber.

8 Claims, 1 Drawing Figure

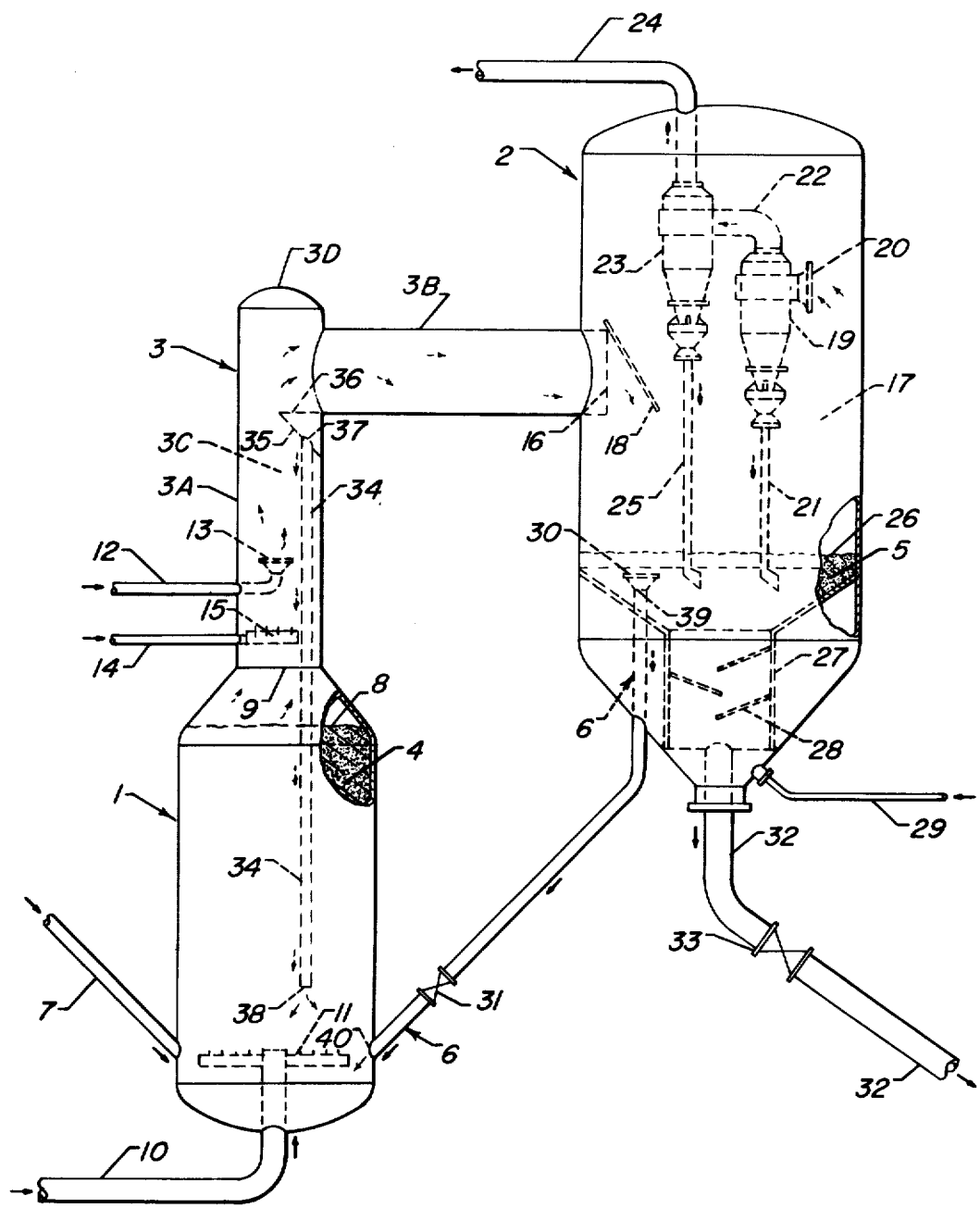

SPENT CATALYST REGENERATION APPARATUS WITH INTERNAL AND EXTERNAL REGENERATED-CATALYST RECYCLE MEANS

CROSS-REFERENCE TO RELATED APPLICATIONS

This application is a continuation-in-part application of my copending application Ser. No. 429,422 filed Dec. 28, 1973, issued April 27, 1976 as U.S. Pat. No. 3,953,175, all the teachings of which are incorporated herein by specific reference thereto.

BACKGROUND OF THE INVENTION

1. Field of the Invention

The field of art to which this invention pertains is catalyst regeneration apparatus. More specifically, the present invention relates to a regeneration apparatus which is applicable for use in regenerating fluidizable catalytic cracking catalysts which have become spent by the deposition of coke on the catalysts in a hydrocarbon reaction zone.

2. Description of the Prior Art

In most regeneration processes presently employed the oxidation of coke from spent catalyst is done in a single-vessel regeneration apparatus containing one or more dense-phase beds of catalyst located in the bottom of the apparatus with a large dilute-phase disengaging space positioned above and in connection with a dense bed. In this type of regeneration process the dense-phase bed of catalyst is maintained in the bottom portion of the apparatus by limiting the superficial velocity of the incoming fresh regeneration gas to the transport velocity, that is, the velocity above which large amounts of catalyst would be carried out of the dense bed to the disengaging space. Typical velocities are therefore less than about 3 feet per second with 1.5 to 2.5 being the usual range. Provisions are made for recovering and returning to the dense bed any catalyst entrained in the flue gas effluent passing from the dense bed. This is generally carried out by passing this effluent flue gas containing entrained catalyst through separation means such as cyclone separation devices located in the disengaging space and returning separated catalyst to the same dense bed. Average residence time of the catalyst within the apparatus per pass through the apparatus is generally in the 2 to 5 minute range with 2 to 3 minutes being the more common, while the residence time of gas is generally within the range of 10 to 20 seconds. All of the regenerated catalyst is returned directly from the regeneration apparatus to the hydrocarbon reaction zone without additional passes through any part of the regeneration apparatus.

It is also general refinery practice to operate conventional regeneration apparatus in a manner to essentially preclude afterburning anywhere within the regeneration apparatus. The term "afterburning" as used herein and as generally understood by those skilled in the art shall mean the uncontrolled, unintentional, and generally incomplete oxidation of CO to $CO_2$. Generally, afterburning occurs during periods of unsteady state operations or process "upsets." This prevention of significant afterburning is generally done by controlling the oxygen-containing gas stream introduced to such regeneration apparatus directly responsive to a rather small predetermined temperature differential between the flue gas outlet or the disengaging space and the dense bed of the regeneration apparatus. Excess oxygen within the regeneration apparatus is thus minimized thereby severely limiting CO afterburning to only that amount characterized by the small temperature differential.

Since the conversion of CO to $CO_2$ is quite exothermic, this restricting of CO afterburning in conventional regeneration apparatus is done for the very practical reason of avoiding the damaging effects of excessively high temperatures in the upper disengaging space region of the regeneration apparatus where there is little catalyst present to act as a heat sink. This practice, as exemplified by Pohlenz U.S. Pat. Nos. 3,161,583 and 3,206,391, produces a small amount of oxygen in the flue gas, generally in the range of about 0.1 to 1% oxygen, results in the flue gas containing from about 7 to about 14 vol. % CO and limits the temperatures achieved in the regeneration apparatus to a maximum of about 1275° F. Present industry practice is to direct the flue gas containing CO to the atmosphere or to a CO boiler where it is used as fuel to make steam.

Controlling the amount of fresh regeneration gas to permit a slight amount of afterburning and the once-through flow of catalyst through the regeneration apparatus essentially fixes the degree of catalyst regeneration, that is, the amount of residual coke on regenerated catalyst. Although it is widely known that the residual coke content on regenerated catalyst has a great influence on the conversion and product distribution obtained in the reaction zone, residual coke level on regenerated catalyst produced by present regeneration processes conducted in conventional regeneration apparatus is not an independent variable but is fixed for each regeneration apparatus design at a level typically from about 0.05 to about 0.4 wt. % carbon, and more often from about 0.15 to about 0.35 wt. % carbon.

By way of contrast, my invention centers around an apparatus for oxidizing coke and for the intentional, controlled, and essentially complete conversion of CO to $CO_2$ within the apparatus. More specifically, the apparatus of my invention provides for coke oxidation and for essentially complete combustion within the apparatus of the CO produced and for the recovery within the apparatus of at least a portion of the heat of combustion of CO. This is distinguished from conventional regeneration apparatus in which afterburning is essentially precluded anywhere within the apparatus and in which no chemical heat of CO combustion is recovered within the apparatus. My invention recognizes the differences in the kinetics of coke oxidation and CO oxidation and provides separate regions within the regeneration apparatus for each to take place. Coke is oxidized primarily in a dense bed of fluidized catalyst in the spent-catalyst receiving chamber to produce regenerated catalyst and partially spent regeneration gas which are passed through a transfer conduit where essentially complete CO oxidation takes place and where heat of combustion is transferred to the regenerated catalyst passing through that zone. The resulting hot regenerated catalyst and spent regeneration gas are separated within a regenerated-catalyst receiving chamber and the regenerated catalyst is directed to a dense bed in the bottom portion of the regenerated-catalyst receiving chamber.

An internal regenerated-catalyst recycle means and an external regenerated-catalyst recycle means are provided to return hot regenerated catalyst from the transfer conduit and from the dense bed of catalyst in the regenerated-catalyst receiving chamber, respectively, to the dense bed of catalyst in the spent-catalyst receiving chamber to increase the catalyst residence time and the temperature in the spent-catalyst receiving chamber and hence the rate and extent of coke oxidation. The increased rate of reaction and catalyst residence time within the spent-catalyst receiving chamber result in regenerated catalyst having lower levels of residual coke. Additionally, the rate of CO buring in the transfer conduit is also increased because of the higher inlet temperature thereby producing lower CO concentrations in the spent regeneration gas leaving the apparatus. The remainder of the regenerated catalyst from the regenerated-catalyst receiving chamber is returned to the hydrocarbon reaction zone at a higher temperature than is produced in non-CO-burning regeneration apparatus which permits reduced feed preheat requirements.

SUMMARY OF THE INVENTION

It is, accordingly, a broad object of the present invention to provide a catalyst regeneration apparatus comprising a spent-catalyst receiving chamber, a transfer conduit, a regenerated-catalyst receiving chamber, an internal regenerated catalyst means, and an external regenerated-catalyst recycle means uniquely and advantageously arranged to offer features not found in present regeneration apparatus.

More specifically, it is an object of the present invention to present a spent-catalyst regeneration apparatus in which coke can be oxidized and in which CO can be essentially completely converted to $CO_2$ in a manner such that at least a portion of the heat of combustion of CO can be recovered within the apparatus and in a manner such that the density and the temperature of the dense-phase bed of catalyst (and hence the rate and extent of coke oxidation) can be controlled by the recycle of hot regenerated catalyst back to dense-phase bed of catalyst where coke is oxidized.

It is an additional object of my invention that many existing single-vessel regeneration apparatus, including the cyclone separation devices they contain, shall be capable of being incorporated into my apparatus thus saving on construction cost. The specific shape and arrangement of the components of my apparatus permits the incorporation of many existing single-vessel regenerators into my apparatus and the internal regenerated-catalyst recycle means of my apparatus helps assure that existing cyclone separation devices can be used in my apparatus by reducing the amount of catalyst to be separated by the cyclones.

My invention can be briefly summarized as a catalyst regeneration apparatus comprising in combination: (a) a spent-catalyst recieving chamber for containing a dense-phase fluidized bed of catalyst having a spent-catalyst inlet means and a fresh-regeneration gas inlet means connected thereto to allow passage of spent catalyst and fresh regeneration gas respectively into said chamber and having a regenerated-catalyst/regeneration-gas outlet means connected thereto to allow passage of regenerated catalyst and regeneration gas from said chamber; (b) a transfer conduit having a substantially vertical portion and a substantially horizontal portion, said vertical portion having an inlet connected to the regenerated-catalyst/regeneration-gas outlet means and said horizontal portion extending into the side of a hereinafter described regenerated-catalyst receiving chamber and having an outlet within said chamber whereby regenerated catalyst and regeneration gas are carried from said spent-catalyst receiving chamber in admixture to said regenerated-catalyst receiving chamber; (c) an internal regenerated-catalyst recycle means, having an inlet means in the transfer conduit and an outlet means in the spent-catalyst receiving chamber, to allow passage of a portion of regenerated catalyst from the transfer conduit to the spent-catalyst receiving chamber; (d) a regenerated-catalyst receiving chamber for containing a dense-phase bed of regenerated catalyst said chamber having a regenerated-catalyst outlet means and a spent-regeneration gas outlet means connected thereto to allow passage of regenerated catalyst and spent regeneration gas from said chamber and said chamber being positioned adjacent to and at an elevation with respect to said spent-catalyst receiving chamber to maintain at least a portion of said dense-phase bed of regenerated catalyst above said dense-phase fluidized bed of catalyst in said spent-catalyst receiving chamber; and, (e) an external regenerated-catalyst recycle means, having an inlet means in the regenerated-catalyst receiving chamber and an outlet means in the spent-catalyst receiving chamber, to allow passage of a portion of regenerated catalyst from the regenerated-catalyst receiving chamber to the spent-catalyst receiving chamber.

Other embodiments and objects of the present invention encompass further details such as the function and arrangement of these various elements all of which are hereinafter disclosed in the following discussion of each of these facets of the invention.

DESCRIPTION OF THE DRAWING

Having thus described the apparatus of my invention in brief general terms, reference is now made to the drawing depicting the side view of the apparatus. The drawing also indicates to those skilled in the art how an existing single-vessel regeneration apparatus of the type in common use at the present time might be modified to construct the apparatus of my invention.

While the invention will be described in connection with a preferred embodiment, it will be understood that it is not intended to limit the invention to that embodiment. On the contrary, it is intended to cover all alternatives, modifications, and equivalents as may be included within the spirit and scope of the invention as defined by the appended claims. It will also be understood that the drawing is only shown in such detail as is necessary for an understanding of the invention and that various items such as minor valves, bleed and dispersion steam lines, expansion joints, instrumentation, and other control means have been omitted for the sake of simplicity.

The drawing shows the apparatus of my invention which basically comprises as the largest components a spent-catalyst receiving chamber 1, a regenerated-catalyst receiving chamber 2, and a transfer conduit 3.

Spent-catalyst receiving chamber 1, shown in the lower left region of the drawing, has a dense-phase fluidized bed of catalyst 4, having a level or interface 8, maintained within the chamber. Attached to spent-catalyst receiving chamber 1 are shown spent-catalyst inlet means 7 and fresh-regeneration-gas inlet means 10. Spent catalyst from a hydrocarbon reaction zone (not shown) is continuously introduced to the dense bed 4 via spent-catalyst inlet means 7. A controlled stream of fresh regeneration gas is continuously introduced via fresh-regeneration-gas inlet means 10 into bed 4 through distributing means 11 which allows the fresh regeneration gas to be more readily dispersed within the dense bed 4. Typically the distributing means can be a metal plate containing holes or slots or preferably a pipe-grid arrangement, both types of which are familiar to those skilled in the art. Oxidation of the carbonaceous deposits on the spent catalyst takes place in dense bed 4 to produce partially spent regeneration gas and regenerated catalyst both of which pass out of chamber 1 in admixture through regenerated-catalyst/regeneration-gas outlet means 9, located at the top of chamber 1, and into transfer conduit 3 wherein CO oxidation takes place to produce spent regeneration gas and where a portion of the heat of combustion of the carbon monoxide to carbon dioxide is transferred to the catalyst being transported.

Transfer conduit 3 has substantially vertical portion 3A and a substantially horizontal portion 3B joined at a substantially right angle and has an interior volume 3C. Substantially vertical portion 3A has an inlet 9 at its lower end which is connected to the regenerated-catalyst/regeneration-gas outlet means of chamber 1. The inlet of transfer conduit 3 is labeled 9 as is regenerated-catalyst/regeneration-gas inlet means since they are in communication with each other.

The mixture of regeneration gas and regenerated catalyst passing through portion 3A of transfer conduit 3 is directed by the substantially right angle to substantially horizontal section 3B of transfer conduit 3. The substantially horizontal portion 3B extends into the side of regenerated-catalyst receiving chamber 2 and has an outlet means 16 which may comprise single of multiple openings located within chamber 2 to allow catalyst and spent regeneration gas to pass out of the transfer conduit 3.

Cap 3D is located at the upper end of the vertical portion 3A and is so positioned that a certain volume of the vertical portion is contained above the top of horizontal portion 3B. This section provides volume which can fill up with the catalyst and gas mixture thereby creating a cushion which prevents attrition in the upper end of the vertical portion when catalyst particles are directed from the vertical portion to the horizontal portion of the transfer conduit.

An internal regenerated-catalyst recycle means comprising a catalyst collecting means 35 and a conduit 34 is shown positioned in portion 3A of transfer conduit 3 and in spent-catalyst receiving chamber 1. Catalyst collecting means 35 is positioned in the upper part of portion 3A near the junction of portion 3A and portion 3B of transfer conduit 3. Conduit 34 extends downward through portion 3A of transfer conduit 3 and into the dense-phase bed of catalyst 4 within spent catalyst receiving chamber 1. Catalyst collecting means 35 has a catalyst inlet means 36 and a catalyst outlet means 37 while conduit 34 has an inlet means 37 and an outlet means 38. The catalyst outlet means 37 of collecting means 35 is attached to inlet means 37 of conduit 34 so both are indicated by the same number. A portion of the hot regenerated catalyst passing through portion 3A and entering portion 3B of transfer conduit 3 falls into the catalyst inlet means 36 of collecting means 35 and passes downward through the catalyst collecting means 35 and conduit 34 into dense bed 4 within spent catalyst receiving chamber 1.

The internal regenerated-catalyst recycle means provides a continuous return of a portion of the hot regenerated catalyst from the transfer conduit 3 to the dense-phase bed of catalyst 4 where coke oxidation takes place thereby increasing the density and the temperature of the dense bed 4.

An external combustible fluid such as fuel gas or a liquid hydrocarbon stream may be admitted into the volume 3C within the conduit 3 through optional combustible-fluid inlet means 12. The burning of such a fluid within volume 3C may be necessary to assist in initial process start-up, to increase the temperature within volume 3C sufficiently to initiate carbon monoxide oxidation, or to increase the temperature of the catalyst particles passing through the conduit beyond that which could be achieved by CO burning alone. Although not shown in the figure, additional combustible fluid could be added to chamber 1 for some of or all of the above reasons. Optional distribution means 13 can be used to help distribute combustible fluid across the cross-sectional area of the transfer conduit 3.

Additionally, a second stream of fresh regeneration gas may be admitted into volume 3C through optional fresh-regeneration-gas inlet means 14. This fresh regeneration gas stream may be for the purpose of supplying needed oxygen to support burning of the external combustible fluid or to insure the essentially complete combustion of CO within transfer conduit 3. Optional distribution means 15 can be used to help distribute the fresh regeneration gas across the cross-sectional area of the transfer conduit 3.

Regenerated-catalyst receiving chamber 2, containing a dilute-phase disengaging space 17 in the upper portion of the chamber wherein cyclone separation means are located and containing a dense-phase bed of regenerated catalyst 5 having a level or interface located at 26 in the lower portion of the chamber, will be recognized by those skilled in the art of FCC processes as very similar to the single-vessel regeneration apparatus now commonly used for catalyst regeneration. The drawing indicates that the apparatus of my invention can be constructed by modifying that vessel into a regenerated-catalyst receiving chamber and by adding a new spent-catalyst receiving chamber, transfer conduit and regenerated-catalyst recycle means.

The substantially horizontal portion 3B of conduit 3 extends into volume 17 and the transfer conduit outlet means 16 is located within chamber 2 above interface 26 of dense bed 5. Outlet means 16 will be catalyst to or in communication with a separation means whereby catalylst and regeneration gas passing out of conduit 3 can be separated. Separation means which can be employed shall include: a disengaging space by itself in which separation of regenerated catalyst and spent regeneration gas takes place by a sudden decrease in velocity of the mixture of catalyst and gas leaving outlet means 16; cyclone separation means arranged in parallel or series flow arrangements to achieve the desired degree of separation; or, combinations of a disengaging space and cyclone separation means. In the embodiment indicated in the drawing the separation means is a combination of disengaging space 17 and cyclone separation means 19 and 23 which combination is effectively used to achieve the desired degree of separation. Regenerated catalyst and spent regeneration gas pass out of the transfer circuit 3 through outlet means 16 and into disengaging space 17 where some separation of catalyst and gas occurs by the sudden decrease in velocity of the mixture. Baffle plate 18 directs the flow of catalyst and gas in a generally downward direction within the vessel. Spent regeneration gas and entrained catalyst pass from disengaging space 17 into cyclone separation means 19, through inlet 20. Spent regeneration gas substantially free of catalyst passes out of cyclone separation means 19 through outlet conduit 22 while separated catalyst passes through dipleg 21 directed downward toward dense bed 5. Outlet conduit 22 directs separated spent regeneration gas containing small amounts of entrained spent catalyst from cyclone separation means 19 into another cyclone separation means 23. Spent regeneration gas is again separated from regenerated catalyst in cyclone separation means 23 with the spent regeneration gas passing out of cyclone separation means 23 and out of vessel 2 via spent regeneration gas outlet means 24 while catalyst passes through dipleg 25 directed downward toward dense bed 5 which has a level or interface at 26.

The preferred separation means described above permits the cyclone separation means in an existing regeneration vessel to remain in essentially their original position thus simplifying the modification required to convert such an existing regeneration vessel into the regenerated-catalyst receiving chamber which is a part of my invention. Alternatively, with additional modification, inlet 20 of cyclone separation means 19 could of course be attached directly to outlet means 16 of transfer conduit 3.

Regenerated catalyst in dense bed 5 moves in a downward direction and passes out of regenerated-catalyst receiving chamber 2 through both regenerated-catalyst outlet means 32 and through regenerated-catalyst recycle means 6.

External regenerated-catalyst recycle means 6 has an inlet means 39 located in regenerated-catalyst receiving chamber 2 and has an outlet means 40 located in spent-catalyst receiving chamber 1 to allow regenerated catalyst to be recycled from chamber 2 to chamber 1. It is, of course, recognized that the same purpose could be achieved if the outlet means 40 of recycle means 6 were located in spent-catalyst inlet means 7 rather than in spent-catalyst receiving chamber 1. Optional collecting means 30 located within dense bed 5 can be used to help direct regenerated catalyst from dense bed 5 into the inlet means 39 of external regenerated-catalyst recycle means 6. External regenerated-catalyst recycle means 6 will typically comprise one or more conduits having control means 31 located thereon to control the amount of regenerated catalyst recycled. The control means 31 would generally be a slide valve whose design and operation is well known to those skilled in the art of fluidized catalyst handling. To ensure unindirectional flow of recycled regenerated catalyst the regenerated-catalyst receiving chamber 2 will be positioned at an elevation with respect to spent-catalyst receiving chamber 1 so that at least a portion of dense bed 5 will be above dense bed 4. With this relationship a sufficient head of regenerated catalyst can be maintained to ensure the flow of regenerated catalyst from dense bed 5 to dense bed 4.

The remainder of the regenerated catalyst will leave regenerated-catalyst receiving chamber 2 through outlet means 32 and be returned to the hydrocarbon reaction zone where the catalyst will again become contaminated with coke. As indicated in the drawing, an optional regenerated-catalyst stripper 27 may be located in the lower portion of chamber 2 to allow stripping of interstitial and adsorbed regeneration gas from the regenerated catalyst prior to its being returned to the reaction zone. Regenerated catalyst will pass downward over baffles 28 and will be countercurrently stripped by a stripping medium which enters the bottom of stripper 27 through inlet means 29. Generally the stripping medium will be steam. Stripped regenerated catalyst will then leave stripper 27 and pass to the reaction zone via outlet means 32. Control means 33 may be located on outlet means 32 to control the rate of withdrawal of stripped regenerated catalyst. Typically control means 33 will be a slide valve which is operated by a reaction-zone temperature or level controller.

DESCRIPTION OF THE INVENTION

At the outset the definitions of various terms will be useful in making clear the operation, objects and advantages of the apparatus of my invention as herein described.

The term "spent catalyst" as used in the claims and specifications shall mean catalyst withdrawn from a hydrocarbon reaction zone because of reduced activity caused by coke deposits. Spent catalyst can obtain anywhere from a few tenths up to about 5 wt. % carbon but typically in FCC operations spent catalyst will contain from about 0.5 to about 1.5 wt. % carbon.

The term "regenerated catalyst" as used herein shall mean catalyst from which the majority of coke has been removed by oxidation in a regeneration apparatus. Regenerated catalyst produced by the apparatus of my invention will typically contain from about 0.01 to about 0.2 wt. % carbon and more specifically and preferably from about 0.01 to about 0.1 wt. % carbon.

At this point the relationship between the term "coke" and the term "carbon" should be noted. The term coke refers to material comprising primarily carbon and hydrogen which is deposited on catalyst in the hydrocarbon reaction zone and which is removed, to varying degrees, by oxidation in regeneration zone. The majority of coke is carbon but hydrogen can comprise from about 5 to about 15 wt. % of the coke. In the refining industry however, coke-containing catalyst samples are commonly and routinely withdrawn from the hydrocarbon reaction zone and the regeneration zone and analyzed for their carbon content and results are reported as weight percent carbon. While this weight percent carbon result approximates the coke content, it is not, strictly speaking, equal to the coke content on a particular catalyst sample.

The term "regeneration gas" shall mean, in a generic sense, any gas which is to contact catalyst or which has contacted catalyst within the regeneration apparatus. Specifically the term "fresh regeneration gas" shall include free-oxygen-containing gases such as air or oxygen-enriched or deficient air which pass into the regeneration apparatus to allow oxidation of coke on the spent catalyst.

The term "partially spent regeneration gas" shall refer to regeneration gas which has contacted catalyst within the spent-catalyst receiving chamber (hereinafter described) and which contains a reduced quantity of free oxygen as compared to fresh regeneration gas. Typically the partially spent regeneration gas will contain several volume percent each of water, nitrogen, oxygen, carbon monoxide, and carbon dioxide. More specifically, the partially spent regeneration gas will contain from about 7 to about 14 vol. % each of carbon monoxide and carbon dioxide.

The term "spent regeneration gas" shall mean regeneration gas which contains a reduced concentration of CO as compared to partially spent regeneration gas. Preferably the spent regeneration gas will contain less than about 1,000 ppm. of CO and more typically and preferably, less than about 500 ppm. CO. It is therefore apparent that the term "essentially complete combustion of CO" as used herein shall mean that the CO concentration in the spent regeneration gas has been reduced to less than about 1,000 ppm. and more preferably less than about 500 ppm. Free-oxygen, carbon dioxide, nitrogen, and water will also be present in the spent regeneration gas. The free-oxygen concentration of the spent regeneration gas will generally be from about 0.1 to 10 vol. % of the spent regeneration gas and more preferably will be from about 0.2 to about 5 vol. %.

The basic components of the regeneration apparatus of my invention, hereinafter described in more detail, are briefly defined as follows. The term "spent-catalyst receiving chamber" shall mean a chamber for containing a dense-phase fluidized bed of catalyst wherein the majority of coke is oxidized. The term "transfer conduit" as used herein shall mean a conduit in which essentially complete CO conversion takes place in the presence of dilute-phase fluidized catalyst to produce spent regeneration gas. The term "internal regenerated-catalyst recycle means" shall mean that component of the regeneration apparatus by which a portion of regenerated catalyst from the transfer conduit is recycled to the dense-phase bed of catalyst within the spent-catalyst receiving chamber. The term "regenerated-catalyst receiving chamber" shall mean a chamber for separating regenerated catalyst and spent regeneration gas and for containing a dense-phase bed of regenerated catalyst. The term "external regenerated-catalyst recycle means" shall mean that component of the regeneration apparatus by which a portion of regenerated catalyst is recycled from the dense-phase bed of regenerated catalyst within the regenerated-catalyst receiving chamber to the dense-phase bed of catalyst within the spent-catalyst receiving chamber. The regenerated-chamber recycle means are "external" or "internal" regenerated-catalyst recycle means depending upon whether at least some portion of the recycle means is "outside of" or external to any other component of the regeneration apparatus or whether the recycle means is "wholly within" or "internal to" any other component of the regeneration apparatus.

In regeneration apparatus now most frequently used in fluid catalytic cracking processes, CO resulting from the oxidation of coke, is not essentially completely oxidized to $CO_2$. Spent catalyst is introduced into the regeneration apparatus wherein catalyst is maintained in a dense bed for average catalyst residence times of two minutes or more by limiting the superficial velocity of the incoming fresh regeneration gas. Coke is oxidized to produce regenerated catalyst and partially spent regeneration gas which are directed out of the regeneration apparatus. Regenerated catalyst produced by present processes is neither stripped of adsorbed and interstitial regeneration gas nor recycled for any purpose within the regeneration apparatus.

More specifically, in present-used regeneration apparatus, the amount of fresh regeneration gas admitted to the apparatus is typically controlled by a predetermined temperature differential between the gas outlet section of the regeneration apparatus and either the dense bed temperature or a dilute phase temperature within the apparatus. Such control scheme minimizes excess oxygen and essentially precludes afterburning within any portion of the regeneration apparatus. Since there is essentially no combustion of CO, temperatures within the regeneration apparatus will generally not be higher than about 1275° F. with the usual range being from about 1150° to about 1250° F. When such a control scheme is used, the amount of residual coke left on regenerated catalyst is largely a function of regeneration apparatus design, that is, how well gas and solids are mixed, the number of stages used, the residence time, and the resulting temperature. Typically regenerated catalyst will contain less than about 0.5 wt. % carbon and usually from about 0.15 to about 0.35 wt. % carbon while spent catalyst entering the regeneration apparatus generally contains from about 0.5 to 1.5 wt. % carbon. Partially spent regeneration gas is separated from entrained regenerated catalyst by cyclone separation means located within the regeneration apparatus and separated gas containing CO is passed from the regeneration apparatus either directly to the atmosphere or to a carbon monoxide boiler where the chemical heat of carbon monoxide is recovered externally to the regeneration apparatus by combustion as a fuel for the production of steam. Separated regenerated catalyst is returned to the bottom portion of the regeneration apparatus and regenerated catalyst then leaves the apparatus, with no prior stripping of regeneration gas, and contacts the feed stock in a reaction zone.

In a typical regeneration apparatus the spent catalyst is maintained in the bottom portion of the apparatus in one or more dense-phase beds by limiting the superficial velocity of the incoming fresh regeneration gas. The superficial velocity is limited to the transport velocity, that is, the velocity above which large amounts of catalyst would be carried out of the dense bed to the cyclones. Typical velocities are therefore less than about 3 feet per second with about 1.5 to about 2.5 being the usual range.

It is this limit on superficial velocity which produces the rather large catalyst inventories found in conventional regeneration apparatus. The determination of the inventory in a typical regeneration apparatus is based upon the feed rate to the FCC process (or more specifically upon the coke yield from that feed rate) and the superficial velocity in the regeneration apparatus. This coke yield anticipated from a desired feed rate determines the rate of the fresh regeneration gas to the regeneration apparatus. This gas rate at a limiting superficial velocity then determines the cross-sectional area of the regeneration apparatus. With a known catalyst density and height of the dense bed the inventory of the regeneration apparatus, and for practical purposes for the FCC process, is fixed. Catalyst residence times which result are generally from about 2 to 5 minutes with about 2 to 3 being the general range.

The amount of catalyst which must be added to the FCC process on a daily basis to make up losses and maintain catalyst activity tends to be a percentage of the total catalyst inventory. Typically the daily makeup catalyst will be from about 1 to about 3% of the total FCC process catalyst inventory depending on such factors as feedstock quality, catalyst attrition resistance, and cyclone separator efficiencies. Since FCC processes with conventional regeneration apparatus have rather large catalyst inventories, the amount of catalyst required for make up is therefore large and the cost of such catalyst, particularly of the more expensive zeolite-containing catalysts, contributes significantly to the daily operating expense of the FCC process.

Thus the typical regeneration apparatus as presently designed and operated has these disadvantages: no provision is made for the essentially complete conversion of CO to $CO_2$ within the apparatus and a CO disposal problem thus arises; with CO conversion essentially precluded, the coke oxidation temperature cannot be increased without burning external torch oil within the apparatus; the regenerated catalyst produced still contains significant amounts of residual coke; and, catalyst inventories and makeup rates tend to be rather large.

In the apparatus of my invention coke from spent catalyst is efficiently oxidized to produce regenerated catalyst having very low residual coke levels and CO produced is essentially completely converted to $CO_2$ with at least a portion of the heat of combustion being recovered within the apparatus. More specifically, efficient oxidation is achieved by employing superficial velocities higher than the transport velocity and by recycling portions of hot regenerated catalyst both from the transport riser and from the regenerated-catalyst receiving chamber back to the spent-catalyst receiving chamber where the majority of coke oxidation occurs.

Very broadly, my apparatus comprises a spent-catalyst receiving chamber, a transfer conduit, an internal regenerated-catalyst recycle means, a regenerated-catalyst receiving chamber, and an external regenerated-catalyst recycle means.

Briefly, spent catalyst and regeneration gas are passed through their respective inlet means into a spent-catalyst receiving chamber containing a dense-phase bed of fluidized catalyst and coke is oxidized to produce regenerated catalyst and partially spent regeneration gas. Regeneration gas and regenerated catalyst are transported from the spent-catalyst receiving chamber through a regenerated-catalyst/regeneration-gas outlet means into a transfer conduit where essentially complete CO oxidation takes place and where at least a portion of the heat of combustion of the CO is transferred to the catalyst. Catalyst residence time in the transfer conduit is sufficiently short to preclude further substantial oxidation of any residual coke and additional production of CO. A portion of the hot regenerated catalyst in the transfer conduit is recycled from the transfer conduit back to the dense-phase catalyst bed in the spent-catalyst receiving chamber to increase the density and the temperature within the chamber thereby increasing both the rate and extent of coke oxidation and increasing the rate of CO oxidation in the transfer conduit. Regenerated catalyst and spent regeneration gas leaving the transfer conduit are separated by separation means located within the regenerated-catalyst receiving chamber. Separated regenerated catalyst passes to a dense bed of catalyst in the bottom portion of the regenerated-catalyst receiving chamber and spent regeneration gas passes out of the chamber and out of the regeneration apparatus through spent regeneration gas outlet means. A portion of the hot regenerated catalyst is then recycled via the external regenerated-catalyst recycle means from the dense-phase bed of catalyst in the regenerated-catalyst receiving chamber to the dense-phase bed of catalyst in the spent-catalyst receiving chamber to provide additional control of the density and the temperature within the latter chamber. The remainder of the regenerated catalyst is returned from the regenerated-catalyst receiving chamber to the reaction zone through a regenerated-catalyst outlet means.

Regenerated catalyst may be optionally stripped of adsorbed and interstitial regeneration gas in a regenerated catalyst stripper.

It is well known in the art that the level of residual coke on the regenerated catalyst has a great influence on the conversion and product yield distribution obtained in the hydrocarbon reaction zone, especially when coke-sensitive zeolite-containing catalysts are employed in the short contact time, dilute-phase hydrocarbon reaction zones. The apparatus of my invention makes it possible not only to produce regenerated catalyst having lower residual coke and therefore higher activity but also to eliminate the problem of CO pollution without requiring an external CO boiler and to recover with the apparatus at least a portion of the heat of CO combustion for advantageous uses within the apparatus and the FCC process. More specifically part of the heat of CO combustion is recovered by the regenerated catalyst thereby producing hotter regenerated catalyst than is produced in non-CO-burning regeneration apparatus.

The recycle of hot regenerated catalyst back to the spent-catalyst receiving chamber increases the rate of coke oxidation and CO conversion thereby making smaller equipment possible. The return of hotter than usual regenerated catalyst to the hydrocarbon reaction zone allows possible reduction in feed preheat requirements.

Dramatic catalyst inventory reductions are possible by the apparatus of my invention. As previously described, inventories in regeneration apparatus are directly related to superficial velocities employed within the regeneration apparatus. Since it is not intended in the apparatus of my invention that catalyst in the spent-catalyst receiving chamber remain in that chamber the superficial velocity of the fresh regeneration gas into the chamber is not limited to the transport velocity. Superficial velocities in the spent-catalyst receiving chamber will be in the range of about 3 to 10 feet per second so that catalyst can be carried from the chamber into the transfer conduit. With superficial velocities now 2 to 3 times the transport velocity, catalyst inventories using the apparatus of this invention will be about 40 to 60 percent of those in present regeneration apparatus As an example, a moderately sized FCC process of the type presently in industry use will contain about 150 tons of catalyst. By using the regeneration apparatus of this invention in an FCC process of the same size, a refiner could save the initial investment represented by at least 75 tons of catalyst.

Catalyst makeup rates required to make up losses and maintain activity will also be reduced by about the same proportion with my apparatus since such rates tend to be a percentage of the total catalyst inventory.

Because of the combination of higher temperatures which result from the recycle of hot regenerated catalyst, better gas-solid contact due to the higher velocities now permitted, higher oxygen partial pressures, and increased density of the dense-phase catalyst bed both the rate and extent or degree of completion of coke combustion in the apparatus of my invention will be increased. Once-through catalyst residence times can be reduced from the present 2 to 5 minutes found in conventional regeneration operation at low superficial velocities to less than about 2 minutes in the coke oxidation portion of my regeneration apparatus.

Besides permitting smaller equipment size another important result or shorter catalyst residence time is that it may allow the steam stripping of flue gas components from the regenerated catalyst. In spite of the fact that flue gas components are entrained by regenerated catalyst into the hydrocarbon reaction zone and hence become part of a product stream, steam stripping of regenerated catalyst has generally not been practiced because of the longer catalyst residence times in conventional regeneration apparatus and because of the entire catalyst inventory is generally maintained in a single dense bed within the apparatus. Exposure of this quantity of catalyst to steam for this longer period of time would increase the catalyst deactivation rate.

Thus the apparatus of my invention overcomes the disadvantages of the prior art regeneration apparatus. With the apparatus of my invention, provision is made for the essentially complete conversion of CO to $CO_2$ within the apparatus thus eliminating a CO disposal problem without the need for a CO boiler; coke oxidation temperature can be increased without burning external torch oil within the apparatus or employing a fresh regeneration gas preheater; the regenerated catalyst produced contains very low amounts of residual coke, and catalyst inventories and makeup rates can be reduced.

Spent catalyst inlet means and fresh-regeneration gas inlet means are connected to the spent-catalyst receiving chamber to carry the spent catalyst from the hydrocarbon reaction zone and fresh regeneration gas into the chamber. Generally these inlet means are conduits which typically may contain distribution devices located on the outlets within the chamber to allow distribution of spent catalyst and fresh regeneration gas within the dense bed of catalyst contained within the spent-catalyst receiving chamber in order to promote efficient oxidation of coke from the catalyst. Preferably, the fresh regeneration gas inlet is connected to or passes through a grid located in the lower portion of the chamber to allow distribution of fresh regeneration gas within the dense bed. A regenerated-catalyst/regeneration-gas outlet means is located at the upper portion of the chamber and specifically at the top of the chamber to allow passage of regenerated catalyst and regeneration gas in admixture from the chamber.

The regenerated-catalyst/regeneration-gas outlet means is connected to the inlet of the transfer conduit which is a cylindrical vessel through which regenerated catalyst and regeneration gas pass in admixture and which CO is essentially completely converted to $CO_2$ to produce spent regeneration gas with at least part of the heat of combustion being transferred to the regenerated catalyst. The cross-sectional area of the transfer conduit will be much smaller than that of the spent-catalyst receiving chamber so that superficial gas velocities within the conduit will be within the range of from about 10 to about 25 feet per second. The transfer conduit may optionally have connected to it combustible-fluid inlet means and fresh-regeneration-gas inlet means to carry external combustible fluid and fresh regeneration gas into the transfer conduit for reasons previously discussed. Typically, these inlet means will be conduits which may contain distribution devices located on their outlets within the tranfer conduit to allow distribution of the combustible fluid and fresh regeneration gas within the conduit.

As noted previously, this transfer conduit will have a substantially vertical portion and a substantially horizontal portion joined together at a substantially right angle. This substantially horizontal portion of the transfer conduit is connected to and extends into the side of the regenerated-catalyst receiving chamber and has an outlet means located within the chamber. The reason for the transfer conduit having both substantially vertical and substantially horizontal portions and the reason for the entrance of the horizontal portion into the side is so that existing single-vessel regeneration apparatus can be used, without having to be relocated from their existing position, as the regenerated-catalyst receiving chamber of my invention. Being able to utilize existing single-vessel regeneration apparatus in its original position permits savings in construction costs.

More specifically, it is necessary that the regenerated-catalyst chamber be positioned at an elevation with respect to the spent-catalyst receiving chamber to maintain at least a portion of the dense-phase bed of catalyst in the former chamber above the dense-phase bed of catalyst in the latter chamber thus maintaining the head necessary to ensure the flow of hot regenerated catalyst from the dense-phase bed of regenerated catalyst in the regenerated-catalyst receiving chamber to the dense-phase bed of catalyst in the spent-catalyst receiving chamber. This requirement, coupled with the fixed location of the old single-vessel regeneration apparatus, dictates the particular configuration of the transfer conduit and its side entrance into the regenerated-catalyst receiving chamber. With this design, the elevation relationship is achieved without having to relocate the existing single-vessel regeneration apparatus used as the regenerated-catalyst receiving chamber. So positioned in this manner, the two chambers will be adjacent to each other.

The transfer conduit will have contained within it an internal regenerated-catalyst recycle means by which a portion of hot regenerated catalyst entering the transfer conduit can be collected and returned to the dense-phase bed of catalyst in the spent-catalyst receiving chamber. The inlet to the recycle means will typically be at or near the substantially right angle formed by the junction of the vertical and horizontal portions of the transfer conduit. When the regeneration apparatus is operating a continuous stream of hot regenerated catalyst from the transfer conduit will be returned to the dense-phase catalyst bed in the spent-catalyst receiving chamber thereby increasing the density and the temperature of the catalyst bed. The internal recycle means will generally be designed to recycle regenerated catalyst in an amount equal to about 2 to about 200% of the amount of spent catalyst entering the spent-catalyst receiving chamber. More preferably the recycle means will be designed to recycle an amout of regenerated catalyst equal to about 25 to 100% of the entering spent catalyst. For reliability and to avoid any maintenance which would necessitate a shutdown of the regeneration apparatus the external regenerated-catalyst recycle means will typically be designed with no moving parts such as flow control means. The recycle of hot regenerated catalyst serves to increase the temperature in the spent-catalyst receiving chamber thereby increasing the rate of reaction of coke oxidation. As well the total residence time that catalyst in the spent-catalyst receiving chamber also increases which further tends to produce regenerated catalyst having a very low residual carbon content.

The outlet of the transfer conduit will be connected to a separation means within the regenerated-catalyst receiving chamber provided to separate regenerated catalyst and spent regeneration gas passing from the transfer conduit. Such separation means may comprise: a disengaging chamber by itself in which separation is effected by a sudden decrease in superficial velocity of the gas-catalyst mixture exiting the transfer conduit into the chamber; one or more cyclone separation means comprising parallel or series flow arrangements of cyclone separation devices to effect the desired degree of separation; or combinations of a disengaging space and cyclone separation means. In the preferred embodiment, the separation means will comprise a combination of a disengaging space and cyclone separation means. Initial separation will take place by a sudden decrease in velocity as the catalyst-fluid mixture exists from the transfer conduit into the disengaging space. Additional separation is then achieved by the cyclone separation means. This arrangement is preferred so that the cyclone separation means in the existing single-vessel regeneration apparatus can be used without relocation.

Separated regenerated catalyst is directed downward toward a dense-phase bed of regenerated catalyst located in the lower portion of the regenerated-catalyst receiving chamber. Regenerated-catalyst outlet means and spent-regeneration-gas outlet means are connected to this chamber at the lower and upper portions respectively to carry regenerated catalyst from the chamber to the hydrocarbon reaction zone and spent regeneration gas from the chamber respectively. Typically, these means are conduits which may have control means such as slide valves located thereon to control the flow of catalyst or gas.

The regenerated-catalyst receiving chamber may optionally have located in the lower portion thereof a regenerated-catalyst stripper to strip regenerated catalyst of adsorbed and interstitial regeneration gas prior to return of the catalyst from the chamber to the reaction zone. Such a stripper would typically be concentric with the chamber and would contain baffles over which regenerated catalyst from the dense bed would flow in a downward direction against an upward flow of stripping medium which would generally be steam. An existing single-vessel regeneration apparatus, which is intended to be adopted for use as a regenerated-catalyst receiving chamber, could relatively easily be fitted with such a catalyst stripper.

An external regenerated-catalyst recycle means having an inlet means in the regenerated-catalyst receiving chamber and an outlet means in the spent-catalyst receiving chamber and connecting the two chambers is provided as part of my apparatus to permit additional control over the coke oxidation conditions within the spent-catalyst receiving chamber. The external regenerated-catalyst recycle means will typically comprise one or more conduits, having a flow regulating means such as valves located thereon, connected to the regenerated catalyst receiving chamber and to either the spent-catalyst receiving chamber or to the spent catalyst inlet means. The external regenerated-catalyst recycle means having a flow regulating means will additionally provide a degree of "fine control" over the temperature and density of the dense-phase bed in the spent-catalyst receiving chamber. Since a portion of this recycle means is external to any other portion of the apparatus, access to any moving parts such as flow regulating means can be had without necessitating a complete shutdown of the apparatus. This recycle means will generally be designed to recycle an amount of regenerated catalyst equal to about 1 to about 100% but more preferably from about 5 to about 50% of the amount of spent catalyst entering the spent-catalyst receiving chamber.

Materials of construction for building the apparatus of my invention shall be materials which are able to withstand the abrasive conditions inherent in the fluidized-catalyst apparatus and which are able to withstand the high temperatures involved. Specifically, metals such as carbon steel and stainless steel which may or may not be lined with abrasion-resistant refractory linings are contemplated. The spent-catalyst receiving chamber should be so designed and constructed to withstand constant sustained temperature up to about 1,450° F. and temperatures up to about 1,500° F. or higher for short periods of time up to about 8 hours. The transfer conduit and regenerated-catalyst receiving chamber should be designed to be able to withstand constant sustained operation of 1,450° F. but also be capable of withstanding temperatures as high as 1,550° F. to 1,600° F. for shorter periods of time of up to about 8 hours. The entire apparatus should also be designed for normal operating pressures of from about atmospheric up to about 50 psig.

I claim as my invention:

1. An apparatus for oxidizing coke on spent catalyst which comprises in combination:
   a. a spent-catalyst receiving chamber for containing a dense-phase fluidized bed of catalyst having a spent-catalyst inlet means and a fresh-regeneration-gas inlet means connected thereto to allow passage of spent catalyst and fresh regeneration gas respectively into said chamber and having a regenerated-catalyst/regeneration-gas outlet means connected thereto to allow passage of regenerated catalyst and regeneration gas from said chamber;
   b. a transfer conduit having a substantially vertical portion and a substantially horizontal portion, said vertical portion having an inlet connected to the regenerated-catalyst/regeneration-gas outlet means and said horizontal portion extending into the side of a hereinafter described regenerated-catalyst receiving chamber and having an outlet within said chamber whereby regenerated catalyst and regeneration gas are carried from said spent-catalyst receiving chamber in admixture to said regenerated-catalyst receiving chamber, said transfer conduit having a combustible fluid inlet means to allow passage of combustible fluid to said transfer conduit and a fresh regeneration gas inlet means to allow passage of fresh regeneration gas into said conduit;
   c. an internal regenerated-catalyst recycle means, having an inlet means in the transfer conduit and an outlet means in the spent-catalyst receiving chamber, to allow passage of a portion of regenerated catalyst from the transfer conduit to the spent-catalyst receiving chamber;
   d. a regenerated-catalyst receiving chamber for containing a dense-phase bed of regenerated catalyst, said chamber having a regenerated-catalyst outlet means and a spent-regeneration-gas outlet means connected thereto to allow passage of regenerated catalyst and spent regeneration gas from said chamber and said chamber being positioned adjacent to and at an elevation with respect to said spent-catalyst receiving chamber to maintain at least a portion of said dense-phase bed of regenerated catalyst above said dense-phase fluidized bed of catalyst in said spent-catalyst receiving chamber; and, e. an external regenerated-catalyst recycle means, having an inlet means in the regenerated-catalyst receiving chamber and an outlet means in the spent-catalyst receiving chamber, to allow passage of a portion of regenerated catalyst from the regenerated-catalyst receiving chamber to the spent-catalyst receiving chamber.

2. The apparatus of claim 1 further characterized in that said outlet of said transfer conduit is in communication with a disengaging space provided to separate catalyst and regeneration gas passing through said conduit.

3. The apparatus of claim 1 further characterized in that said regenerated-catalyst receiving chamber has a regenerated-catalyst stripper located in the bottom portion thereof to strip regenerated catalyst.

4. The apparatus of claim 3 further characterized in that said stripper is concentric with said regenerated-catalyst receiving chamber.

5. The apparatus of claim 1 further characterized in that said internal regenerated-catalyst recycle means comprises a regenerated-catalyst collecting means and a conduit.

6. The apparatus of claim 1 further characterized in that said external regenerated-catalyst recycle means comprises one or more conduits having a flow regulating means located thereon.

7. An apparatus for oxidizing coke on spent catalyst which comprises in combination:

a. a spent-catalyst receiving chamber for containing a dense-phase fluidized bed of catalyst, said chamber having upper and lower sections, a fresh-regeneration-gas inlet means connected to said chamber at said lower section to allow passage of fresh regeneration gas into said chamber through said lower section, a spent-catalyst inlet means connected to said chamber to allow passage of spent catalyst into said chamber, and a regenerated-catalyst/regeneration-gas outlet means at the upper section of said chamber to allow passage of regenerated catalyst and regeneration gas in admixture from said chamber;

b. a transfer conduit having a substantially vertical portion and a substantially horizontal portion, said vertical portion having an inlet connected to the regenerated-catalyst/regeneration-gas outlet means and said horizontal portion extending into the side of a hereinafter described regenerated-catalyst receiving chamber and having an outlet means within said chamber in communication with a disengaging space whereby regenerated catalyst and regeneration gas are carried in admixture from said spent-catalyst receiving chamber to said disengaging space, said transfer conduit having a combustible fluid inlet means to allow passage of combustible fluid to said transfer conduit and a fresh regeneration gas inlet means to allow passage of fresh regeneration gas into said conduit;

c. a vertically disposed internal regenerated-catalyst recycle means comprising: a catalyst collecting means, located in the substantially vertical portion of the transfer conduit and having catalyst inlet means and catalyst outlet means; and, a downwardly extending conduit, having an inlet means attached to the outlet means of said collecting means and an outlet means located within the spent-catalyst receiving chamber, to allow passage of a portion of the regenerated catalyst from the transfer conduit to the spent-catalyst receiving chamber;

d. a regenerated-catalyst receiving chamber for containing a dense-phase bed of regenerated catalyst, said chamber being positioned adjacent to and at an elevation with respect to said spent-catalyst receiving chamber to maintain at least a portion of said bed of regenerated catalyst above said dense-bed fluidized bed of catalyst in the spent-catalyst receiving chamber, said regenerated-catalyst receiving chamber having upper and lower sections, a spent-regeneration-gas outlet means connected to said chamber at its upper section to allow passage of spent regeneration gas from said chamber, and a regenerated catalyst stripper within said chamber at its lower section to strip regenerated catalyst, said stripper having connected to its outlet a regenerated-catalyst outlet means to allow passage of regenerated catalyst from the stripper; and, e. an external regenerated-catalyst recycle means comprising one or more conduits, having a flow regulating means located thereon and having an inlet means in the regenerated-catalyst receiving chamber and an outlet means in the spent-catalyst receiving chamber, to allow passage of a portion of catalyst from the dense bed of regenerated catalyst in the regenerated-catalyst receiving chamber to the dense-phase fluidized bed of catalyst in the spent-catalyst receiving chamber.

8. The apparatus of claim 7 further characterized in that said regenerated catalyst stripper is concentric with said regenerated-catalyst receiving chamber.

* * * * *